(12) United States Patent
Assa

(10) Patent No.: US 11,597,671 B2
(45) Date of Patent: Mar. 7, 2023

(54) TRANSPORTABLE WASTEWATER TREATMENT SYSTEMS AND METHODS

(71) Applicant: Laguna Innovation Ltd., Kibbutz Ketura (IL)

(72) Inventor: Amir Assa, Nahariya (IL)

(73) Assignee: Laguna Innovation Ltd., D.N Eilot (IL)

(*) Notice: Subject to any disclaimer, the term of this patent is extended or adjusted under 35 U.S.C. 154(b) by 0 days.

(21) Appl. No.: 17/229,168

(22) Filed: Apr. 13, 2021

(65) Prior Publication Data

US 2022/0324736 A1    Oct. 13, 2022

(51) Int. Cl.
*C02F 9/00* (2006.01)
*C02F 3/00* (2006.01)
(Continued)

(52) U.S. Cl.
CPC .............. *C02F 9/005* (2013.01); *C02F 3/006* (2013.01); *C02F 3/043* (2013.01); *C02F 3/108* (2013.01);
(Continued)

(58) Field of Classification Search
CPC .......... C02F 9/005; C02F 3/006; C02F 3/043; C02F 3/108; C02F 3/223; C02F 3/28; C02F 3/30; C02F 3/325; C02F 2201/009
(Continued)

(56) References Cited

U.S. PATENT DOCUMENTS

| | | | | |
|---|---|---|---|---|
| 3,231,490 A | * | 1/1966 | Fry | .......................... C02F 3/103 210/615 |
| 4,279,753 A | * | 7/1981 | Nielson | .................. C02F 3/2806 210/615 |

(Continued)

FOREIGN PATENT DOCUMENTS

| | | | |
|---|---|---|---|
| CN | 111003892 A | * | 4/2020 |
| ER | 3757201 | | 12/2012 |
| KR | 20140042411 | | 4/2014 |

OTHER PUBLICATIONS

Shi, Jing, Bj?rn Podola, and Michael Melkonian. "Application of a prototype-scale Twin-Layer photobioreactor for effective N and P removal from different process stages of municipal wastewater by immobilized microalgae." Bioresource technology 154 (2014): 260-266. http://dx.doi.org/10.1016/j.biortech.2013.11.100 Shi, Jing et al. Dec. 16, 2013 (Dec. 16, 2013).

(Continued)

*Primary Examiner* — Fred Prince
(74) *Attorney, Agent, or Firm* — Pearl Cohen Zedek Latzer Baratz LLP

(57) ABSTRACT

Transportable wastewater treatment systems and wastewater treatment methods are provided, which employ a clarification unit to treat highly polluted wastewater (e.g., with BODs over 400 mg/l and up to 1500 mg/l) with a small footprint and without elaborate infrastructure or even without grid-based energy sources. The clarification unit comprises an anaerobic digestion unit configured to receive (Continued)

influent and reduce an organic load thereof to yield a first stream, an aerobic anoxic air lift reactor configured to treat the first stream and further reduce the organic load thereof to yield a second stream, and an aerobic unit configured to clarify the second stream and deliver effluent, the aerobic unit comprising a plurality of vertical sheets configured to support growth of algae on biofilm, a sprinkling system configured to sprinkle the second stream onto the vertical sheets, and an organic matter removal unit configured to collect organic mass falling off the vertical sheets.

18 Claims, 6 Drawing Sheets

(51) Int. Cl.
| | | |
|---|---|---|
| *C02F 3/28* | (2006.01) | |
| *C02F 3/30* | (2006.01) | |
| *C02F 3/32* | (2006.01) | |
| *C02F 3/04* | (2006.01) | |
| *C02F 3/10* | (2006.01) | |
| *C02F 3/22* | (2006.01) | |

(52) U.S. Cl.
CPC .............. *C02F 3/223* (2013.01); *C02F 3/28* (2013.01); *C02F 3/30* (2013.01); *C02F 3/325* (2013.01); *C02F 2201/009* (2013.01)

(58) Field of Classification Search
USPC ............. 210/602, 605, 614, 615, 143, 259
See application file for complete search history.

(56) References Cited

U.S. PATENT DOCUMENTS

| | | | | |
|---|---|---|---|---|
| 4,443,337 | A * | 4/1984 | Otani | C02F 3/04 210/615 |
| 4,695,384 | A * | 9/1987 | Ripl | E03B 3/00 210/906 |
| 6,479,276 | B1 * | 11/2002 | Thom | B01D 53/85 210/615 |
| 2002/0072109 | A1 | 6/2002 | Bayless et al. | |
| 2007/0102353 | A1 * | 5/2007 | Murthy | C02F 11/04 210/613 |
| 2013/0140230 | A1 * | 6/2013 | Ott | C02F 3/32 210/603 |
| 2013/0193069 | A1 * | 8/2013 | Aiken | C02F 3/322 210/615 |
| 2014/0158614 | A1 | 6/2014 | Wang | |
| 2015/0376043 | A1 * | 12/2015 | Wett | C02F 3/28 210/601 |
| 2016/0288040 | A1 | 10/2016 | Asa | |
| 2017/0127656 | A1 * | 5/2017 | Bee | C12M 1/002 |
| 2019/0040347 | A1 | 2/2019 | Kim et al. | |

OTHER PUBLICATIONS

International Search Report for PCT Application No. PCT/IL2022/050370 dated Jun. 23, 2022.

* cited by examiner

200

- 210 — Reducing an organic load of received influent by anaerobic digestion to yield a first stream
- 220 — Treating the first stream and further reducing the organic load thereof under aerobic anoxic conditions to yield a second stream
- 230 — Clarifying the second stream and delivering effluent
- 232 — Sprinkling the second stream onto the vertical sheets aerobically
- 234 — Collecting and removing organic matter detaching from and falling off the vertical sheets
- 240 — Operating the method with off-grid energy
- 250 — Controlling flows of the first and second stream remotely

*Figure 3*

TRANSPORTABLE WASTEWATER TREATMENT SYSTEMS AND METHODS

BACKGROUND OF THE INVENTION

1. Technical Field

The present invention relates to the field of wastewater treatment and, more particularly, to treatment of wastewater with high organic loads.

2. Discussion of Related Art

Wastewater treatment plants are large facilities that process wastewater to remove contaminants and clarify the wastewater, utilizing settling tanks, clarifiers and aeration tanks to treat, e.g., sewage, and prevent related sanitary hazards.

Biofilm sheets have been used in the past to treat polluted air. For example, U.S. Patent Application Publication No. 2016/0288040, which is incorporated herein by reference in its entirety, discloses an air purification system for purifying polluted air that includes a scrubber in which a pollutant in the polluted air is transferred to a scrubber liquid. A biological treatment unit includes at least one substantially flat substrate to support a microorganism population to remove the transferred pollutant from the scrubber liquid when the scrubber liquid with the transferred pollutant is distributed on the substrate. A plane of the substrate is substantially parallel to a direction of flow of the air from the scrubber.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a transportable wastewater treatment system comprising a clarification unit that comprises: an anaerobic digestion unit configured to receive influent and reduce an organic load thereof to yield a first stream, an aerobic anoxic air lift reactor configured to treat the first stream and further reduce the organic load thereof to yield a second stream, and an aerobic unit configured to clarify the second stream and deliver effluent, the aerobic unit comprising: a plurality of vertical sheets configured to support growth of algae on biofilm, a sprinkling system configured to sprinkle the second stream onto the vertical sheets, and an organic matter removal unit configured to collect organic mass failing off the vertical sheets.

One aspect of the present invention provides a wastewater treatment method comprising: reducing an organic load of received influent by anaerobic digestion to yield a first stream, treating the first stream and further reducing the organic load thereof under aerobic anoxic conditions to yield a second stream, and clarifying the second stream and delivering effluent by: sprinkling the second stream onto the vertical sheets aerobically, and collecting and removing organic matter falling off the vertical sheets.

One aspect of the present invention provides an aerobic unit configured to clarify wastewater and deliver effluent, the aerobic unit comprising: a plurality of vertical sheets configured to support growth of algae on biofilm, a sprinkling system configured to sprinkle the wastewater onto the vertical sheets, and an organic matter removal unit configured to collect organic mass falling off the vertical sheets.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 3 is a high-level flowchart illustrating wastewater treatment methods, according to some embodiments of the invention.

DETAILED DESCRIPTION OF THE INVENTION

Figure 1:
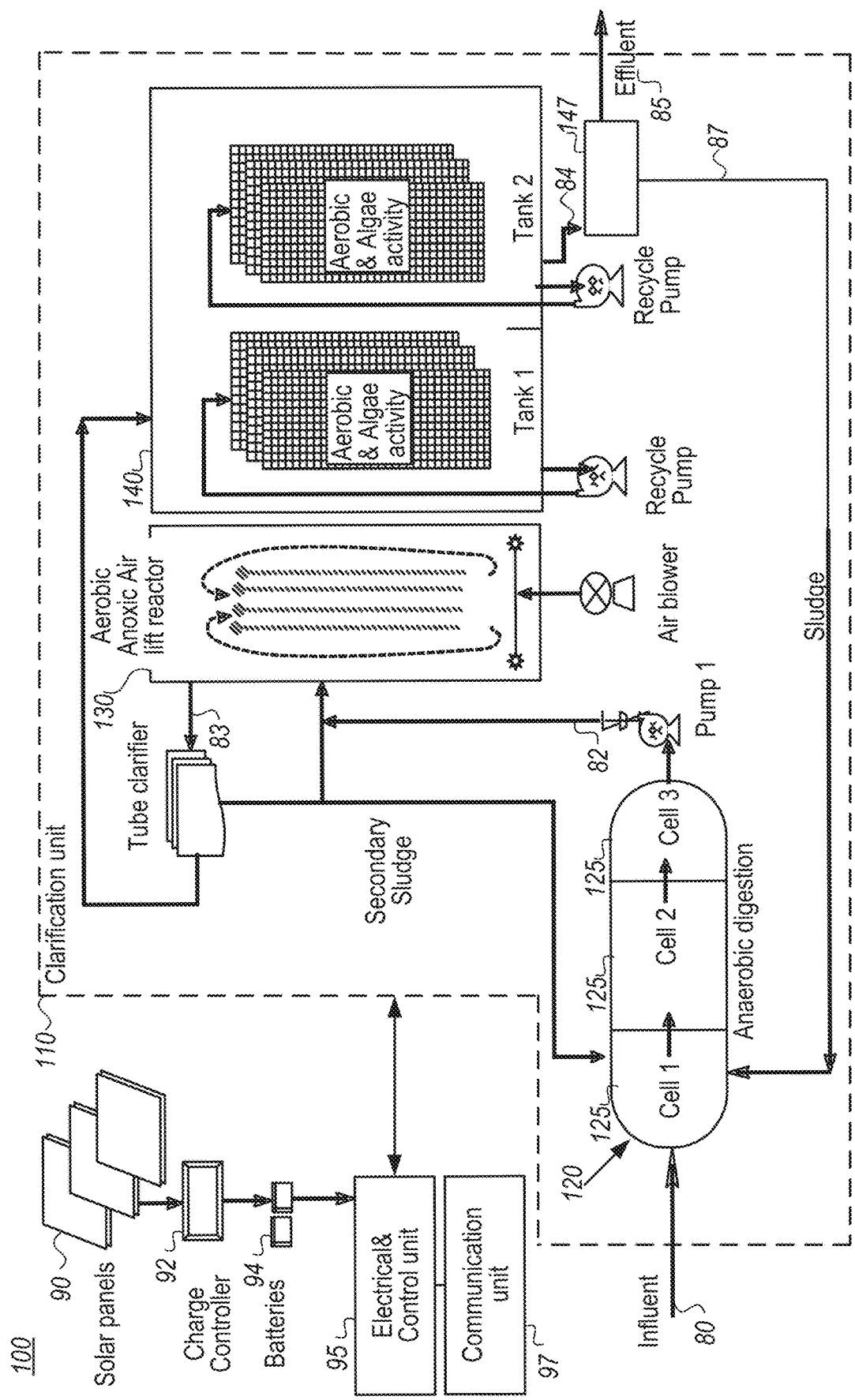
FIG. 1 is a high-level schematic block diagram of transportable wastewater treatment systems, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Some embodiments of the present invention provide efficient and economical methods and mechanisms for wastewater treatment and thereby provide improvements to the technological field of treating highly polluted wastewater at regions remote from the electrical or sewer grid. Transportable wastewater treatment systems and wastewater treatment methods are provided, which employ a clarification unit to treat highly polluted wastewater (e.g., with BODs (biochemical oxygen demand) over 400 mg/l and up to 1500 mg/l) with a small footprint and without elaborate infrastructure or even without grid-based energy sources. The clarification unit comprises an anaerobic digestion unit configured to receive influent and reduce an organic load thereof to yield a first stream, an aerobic anoxic air lift reactor configured to treat the first stream and further reduce the organic load thereof to yield a second stream, and an aerobic unit configured to clarify the second stream and deliver effluent, the aerobic unit comprising a plurality of vertical sheets configured to support growth of algae on biofilm, a sprinkling system configured to sprinkle the second stream onto the vertical sheets, and an organic matter removal unit configured to collect organic mass falling off the vertical sheets.

Figure 2A:
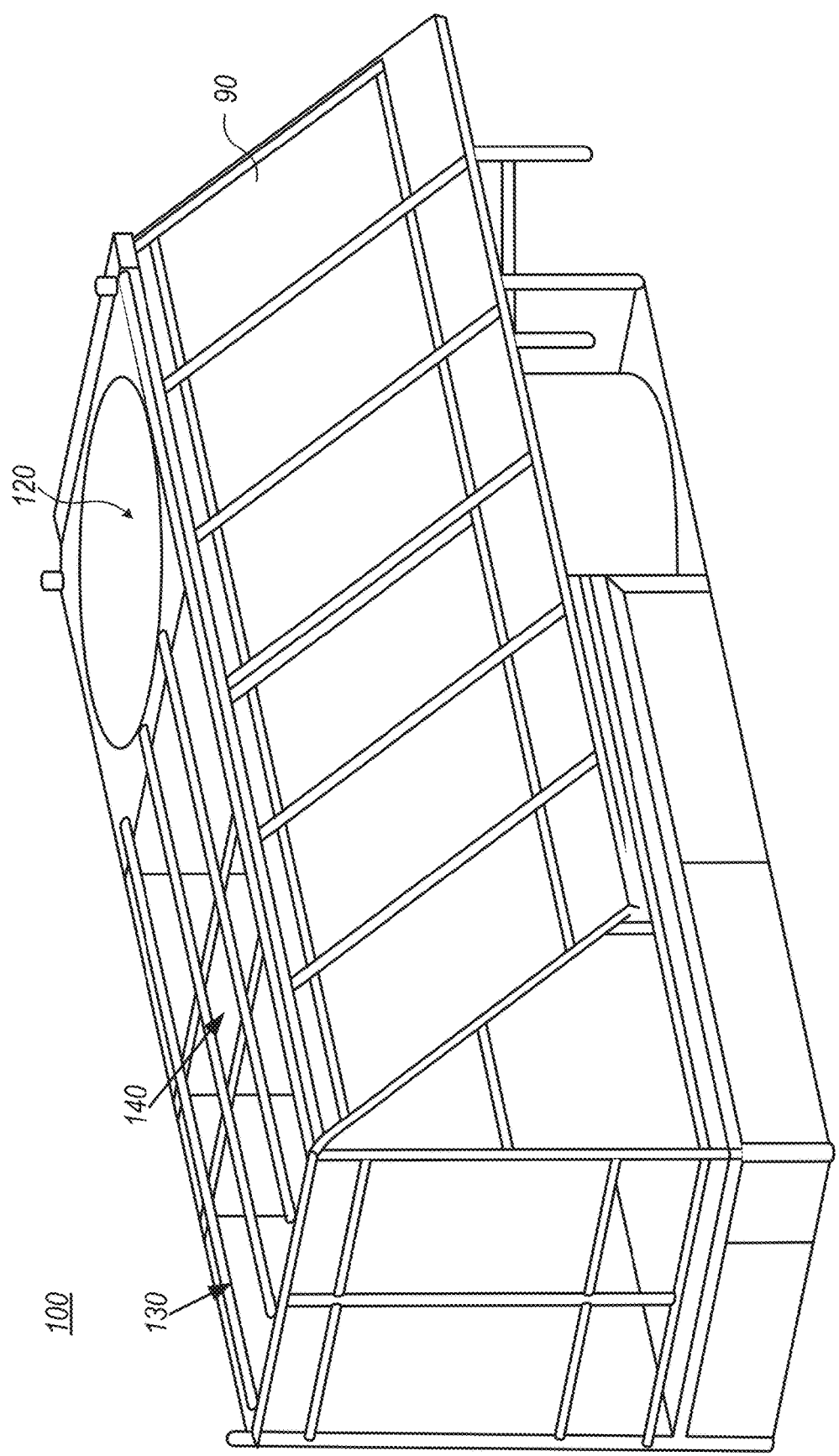
FIG. 2A is a high-level schematic perspective illustration of a clarification unit, according to some embodiments of the invention.
Figure 2C:
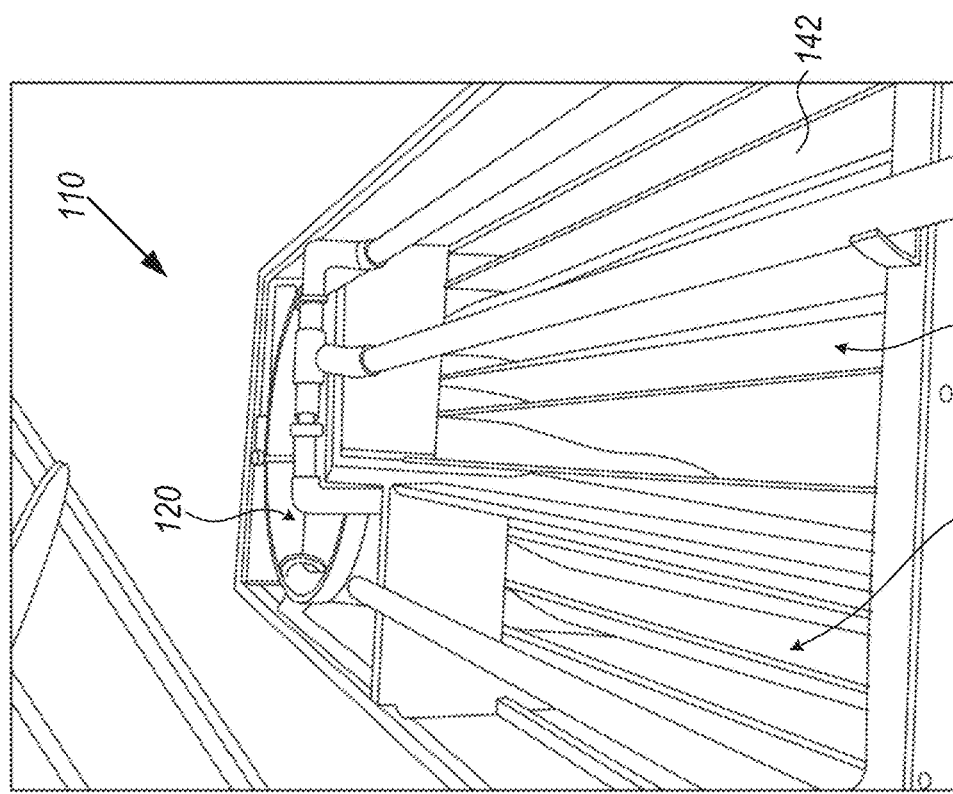
FIG. 2C is a high-level schematic partial perspective top view illustration of a clarification unit, according to some embodiments of the invention.
Figure 2B:
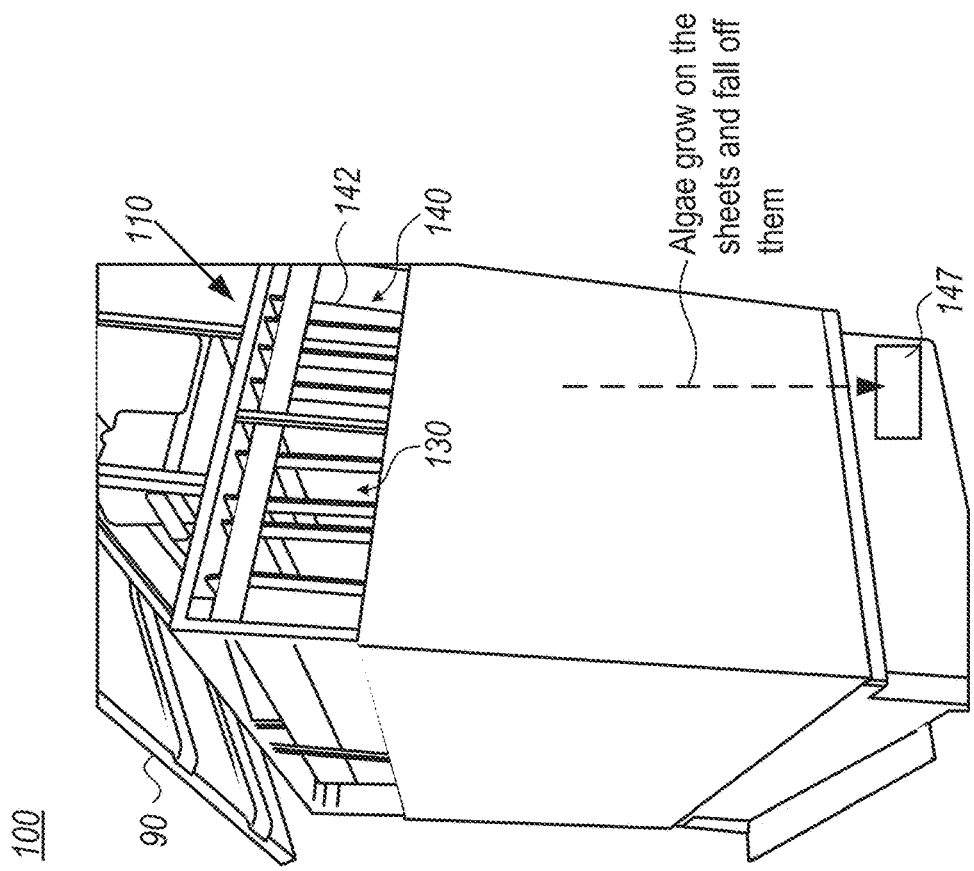
FIG. 2B is a high-level schematic partial side view illustration of a clarification unit, according to some embodiments of the invention.
Figure 2D:
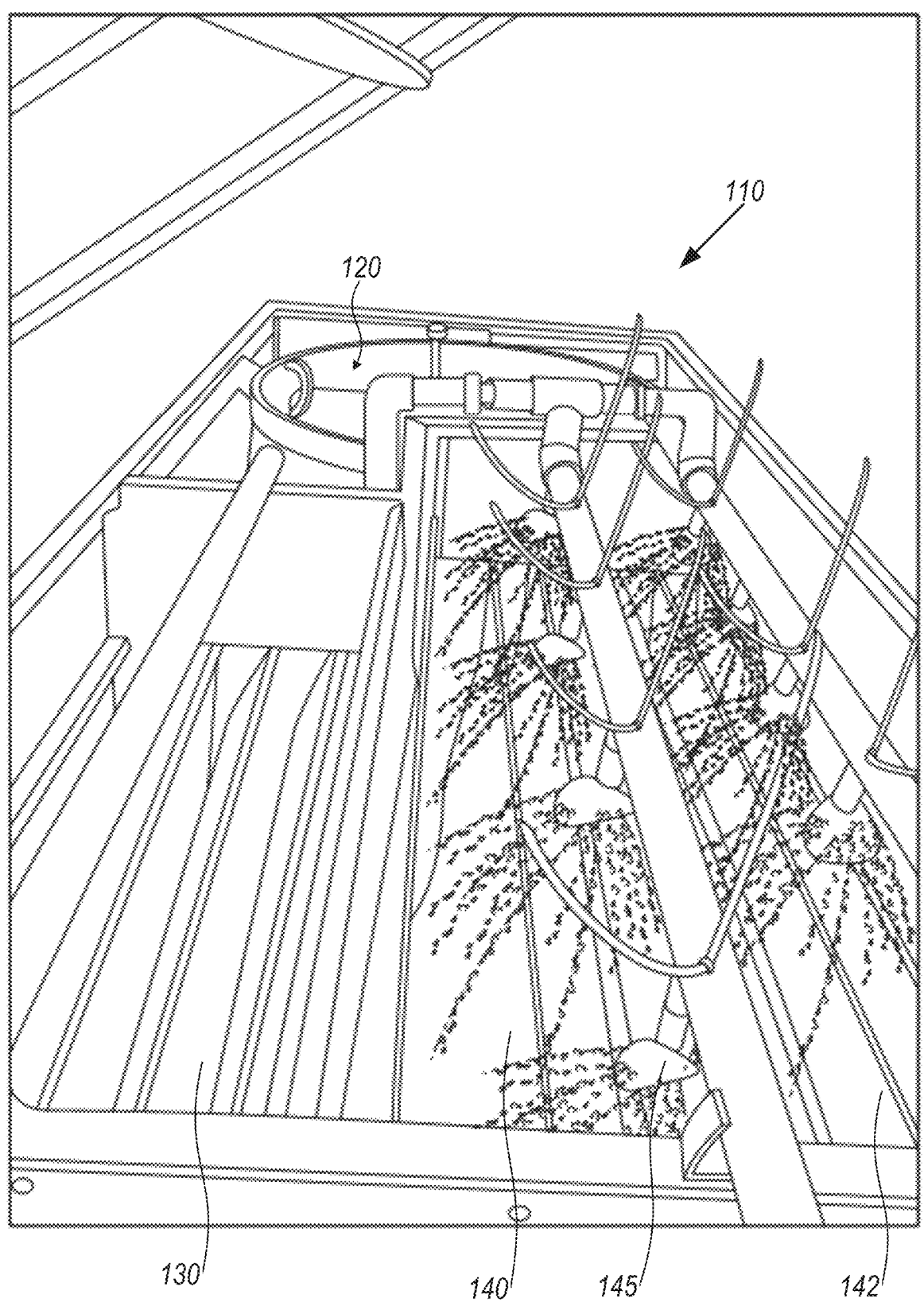
FIG. 2D is a high-level schematic partial perspective top view illustration of a clarification unit with operating sprinklers, according to some embodiments of the invention.

FIG. 1 is a high-level schematic block diagram of a transportable wastewater treatment system 100, according to some embodiments of the invention. FIGS. 2A-2D are high-level schematic illustrations of clarification units 110 in transportable wastewater treatment system 100, according to some embodiments of the invention. FIG. 2A is a perspective view, FIG. 2B is a side view of system 100, and FIGS. 2C and 2D are top views of clarification unit 110, according to some embodiments of the invention.

Transportable wastewater treatment system 100 comprises a clarification unit 110 that comprises: an anaerobic digestion unit 120 configured to receive influent 80 and reduce an organic load thereof to yield a first stream 82, an aerobic anoxic air lift reactor 130 configured to treat first stream 82 and further reduce the organic load thereof to yield a second stream 83, and an aerobic unit 140 configured to clarify second stream 83 and deliver effluent 85. Aerobic unit 140 may comprise a plurality of vertical sheets 142 configured to support growth of algae on biofilm, a sprinkling system 145 configured to sprinkle second stream 83 onto vertical sheets 142, and an organic matter removal unit 147 configured to collect organic mass falling from vertical sheets 142. In certain embodiments, aerobic unit 140 may be used independently and/or in other wastewater treatment systems.

As illustrated schematically in FIG. 1, transportable wastewater treatment system 100 may further comprise an energy source 90, such as off-grid energy sources like generators, solar panels and/or wind turbines as main energy sources and/or as back-ups, or grid-based energy sources where available and/or as back-up. Transportable wastewater treatment system 100 may further comprise electric storage devices 94 such as batteries connected to at least one of energy source(s) 90 and configured to store energy from energy source(s) 90 for use when they are not available, e.g., during night or wind-less periods, and/or when the electric grid is not available. In certain embodiments, transportable wastewater treatment system 100 may be transportable and independent of infrastructure, e.g., as all clarification is carried out in transportable clarification unit 110 that does not necessarily require much or any infrastructure (except, e.g., of mechanical support and pipework connections, but not requiring, e.g., constructed clarification units or constructed wetland infrastructure).

In case solar panels 90 are used as energy source 90 (see, e.g., FIG. 2A), clarification unit 110 may be installed with its long axis in east-west direction and with solar panels 90 facing south. In such installation, vertical sheets 142 experience different illumination conditions on either side (south-facing side of sheets 142 receiving more direct illumination and north-facing side of sheets 142 being more in the shade, with pores in sheets 142 allowing interactions between the sides of sheets 142)—which supports species diversity of the biofilm and algae and contributes to the overall efficiency of aerobic unit(s) 140 and clarification unit 110 as a whole. In non-limiting examples, vertical sheets 142 may be several meters long (in the vertical direction, e.g., 3-6 m long) and spaced several centimeters or several tens of centimeters apart (e.g., 10-20 cm down to 5 cm apart), optimizing sheet illumination with respect to the overall size of clarification unit 110.

Transportable wastewater treatment system 100 may further comprise a control unit 95 configured to control the flows through clarification unit 110 in system 100. In certain embodiments, control unit 95 may be controlled remotely, e.g., via communication links. Clarification unit 110 may further comprise pipework, pumps and valves, as disclosed schematically, e.g., in FIG. 1, which are controlled by control unit 95. In case of remote control, any of the operation parameters of transportable wastewater treatment system 100 such as the flows through clarification unit 110 may be measured, communicated via a communication unit 96, and adjusted remotely, e.g., at a control center.

In certain embodiments, anaerobic digestion unit 120 may comprise a plurality of treatment cells 125 which receive influent 80 and possibly also sludge from aerobic anoxic air lift reactor 130 and/or from aerobic unit 140, e.g., via organic matter removal unit 147. Treatment cells 125 may be arranged serially, each receiving fluids from the former cell, applying anaerobic digestion and providing fluids to the next cell. For example, first cell 125 may be configured to remove floating organic matter such as oils and/or to remove solids such as inorganic particles by sedimentation. The floating and/or sinking material may be processed, e.g., biologically, by hydrolysis, by acidic treatment, and/or by any other method, and optionally transferred as well for further treatment, e.g., in second cell 125. Second cell 125 may be configured to further remove floating organic matter and/or sediments, and enhance, e.g., acidogenic digestion of the organic matter in the flow. Third cell 125 may comprise, e.g., a fixed substrate with methanogenic bacteria, that digests most organic compounds (e.g., acids like acetic, propionic and butyric acids) delivered from previous cells 125, e.g., producing biogas which may be used as a partial energy source 90 for system 100. The biogas may be collected for use from the top part of anaerobic digestion unit 120. Advantageously, anaerobic digestion unit 120 may be used to significantly reduce the organic matter and the BOD value in first stream 82 delivered by unit 120 with respect to influent 80, with much lower energy demands and possibly even some energy gains via biogas compared with aerobic digestion. For example, in some test cases, 60% of the organic material was removed from influent by anaerobic digestion unit 120 with a net zero energy consumption.

In certain embodiments, aerobic anoxic air lift reactor 130 may be configured to sediment at least some of the remaining organic material in received first stream 82 as sludge, using reactor 130 with aerobic but anoxic conditions, e.g., with low or no free oxygen, and minimal oxygen availability following decomposition of compounds such as nitrates and nitrites. For example, aerobic anoxic air lift reactor 130 may be configured to have two or more chambers with at least one of the chambers having vertical supports that are at least partly immersed in fluid, and some or all of the chambers having bottom air feed (e.g., from an air blower with diffusers) that provides a minimal level of air and oxygen, and contributed to fluid circulation within aerobic anoxic air lift reactor 130. For example, oxygen concentration may be kept at very low levels of 0.1-0.5 mg/l, contributing to removal of organic matter and pollutants. Sludge formed in aerobic anoxic air lift reactor 130 may be transferred to and further treated by anaerobic digestion unit 120 and remaining fluids may be transferred as second stream 83 to aerobic unit(s) 140.

In certain embodiments, aerobic s) 140 may be configured to receive second stream 83 (e.g., using gravitation, or possibly with some pumping) and to further treat it to reduce organic load and pollutants. It is noted that, even for influent 80 with a very high load of organic matter (e.g., BOD levels of 200-1.500 mg/l, and particularly BOD above 400-500 mg/l or even above 1000 mg/l that characterize heavily polluted wastewater), the treatment by anaerobic digestion unit 120 and aerobic anoxic air lift reactor 130 reduces significantly the level of organic load to BOD levels below 300 g/l or even below 200 mg/l or 100 mg/l, or intermediate values (e.g., typically between 150-200 mg/l)—which are suitable for treatment by algae on biofilm and eukaryotes (in contrast to higher BOD levels in which bacteria out-compete algae on biofilm). Aerobic unit(s) 140 may comprise at least two units in series, each comprising vertical sheets 14 configured to support growth of algae on biofilm, sprinkling system 145 configured to sprinkle second stream 83 onto vertical sheets 142, and organic matter removal unit 147 configured to collect organic mass falling off vertical sheets 142. Vertical sheets 142 may be at least partly exposed to sunlight to encourage algae on biofilm growth, and second stream 83 may be circulated through aerobic unit(s) 140, e.g., by gravitation and/or using low pressure pumps (e.g., one or more 0.8 bar pump(s) per one or more unit). In certain embodiments, second stream 83 may be circulated several times (e.g., 5-10 times) in average over each vertical sheet 142 possibly allocating parts of the fluid with different loads of organic matter to different sections in aerobic unit(s) 140. Due to the serial connections, the first units in the series may be configured to support more intensive algae on biofilm growth, while the last units in the series may be configured to support removal of rudimentary organic material as well as of rudimentary inorganic compounds such as nitrates, nitrites, ammonia, phosphorus etc. Specific units in aerobic unit(s) 140 may be thus adjusted to specific loads of organic material and pollutants. The collected detached organic growth (algae on biofilm falling off sheets 142) may be moved for treatment by anaerobic digestion unit 120.

Figure 4A:
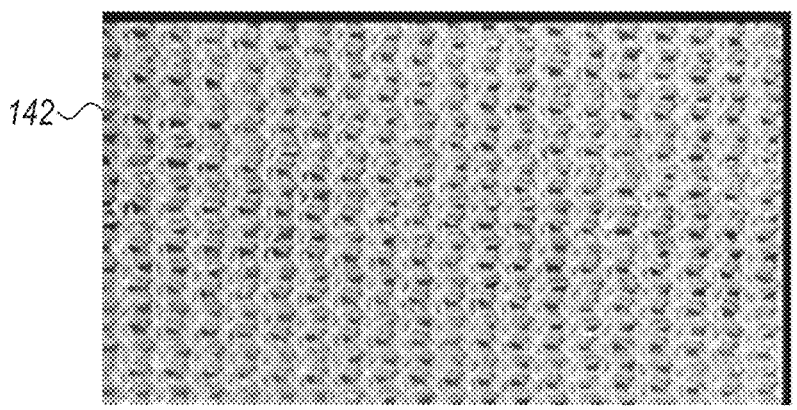
FIG. 4A illustrates an example for vertical sheet material, according to some embodiments of the invention.
Figure 4B:
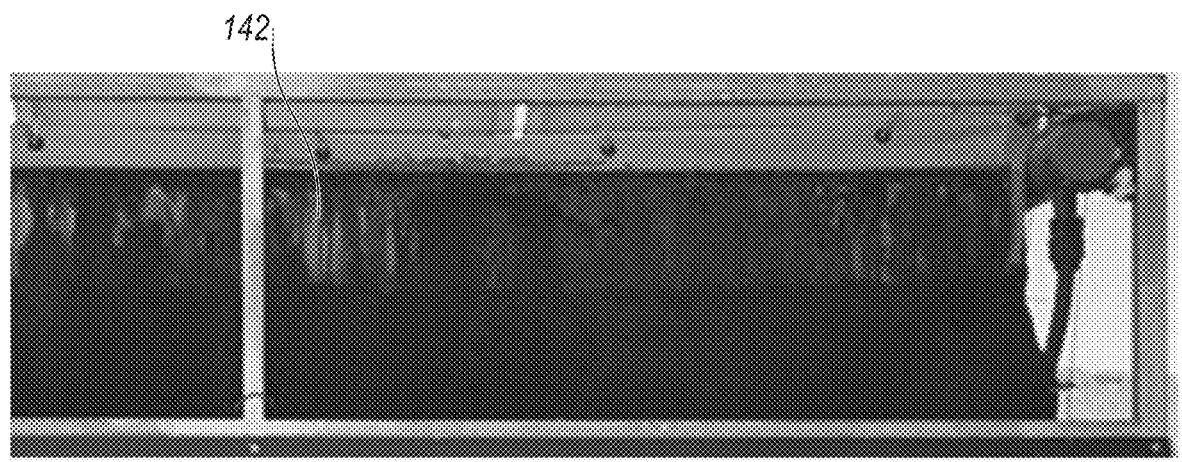
FIG. 4B illustrates an example for a vertical sheet covered with organic material during operation of the aerobic unit, according to some embodiments of the invention.
Figure 4C:
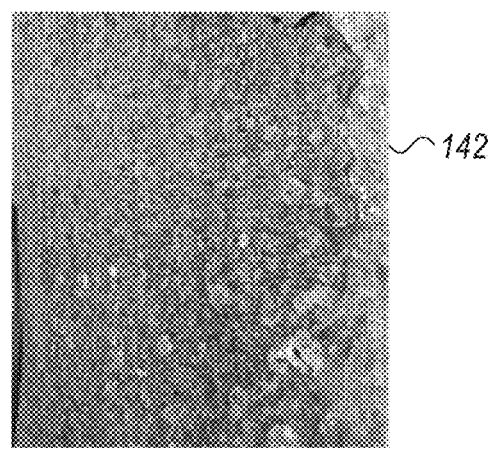
FIG. 4C provides a closer view of algae and biofilm growing on the vertical sheet during operation of the aerobic unit, according to some embodiments of the invention.

FIGS. 4A-4C provide examples for vertical sheets 142 and growth of biofilm and algae thereupon, according to some embodiments of the invention. FIG. 4A illustrates an example for sheet material, FIG. 4B illustrates an example for sheet 142 covered with organic material (the dark material in the image), and FIG. 4C provides a closer view of algae and biofilm growing on sheets 142 during operation of aerobic unit 140.

Vertical sheets 142 may comprise polypropylene (PP) sheets at 50-90% shading (percentage of stopped through-illumination), which were found to support both biofilm and algae growth while allowing regular detachment of clumps of organic matter. For example, as illustrated in FIG. 4A, vertical sheets 142 may comprise weaved PP nets with UV (ultraviolet) stabilizers as used, e.g., in agricultural or other shading applications. Vertical sheets 142 may have some openings (e.g., lower than 100% shading) to allow biological communications between the sides of sheet 142, yet are sufficiently dense (e.g., higher than 50% shading) to support sufficient growth of biofilm and algae. In certain embodiments, vertical sheets 142 may configured to provide 60%, 70% 80% or 90% shading, or intermediate values, Sheets 142 in aerobic unit 14 may be identical, or may vary in their shading percentage. In various embodiments, other materials may be used, in particular UV-resistant materials, possibly treated or coated to enhance growth of biofilm and algae. As shown in FIGS. 4B and 4C, vertical sheets 142 may be optimized to support growth of biofilm material (including, e.g., bacteria and eukaryotic organisms) and of algae that periodically detach from their growth substrate of vertical sheets 142 and are collected by organic matter removal unit 147 organic matter removal unit 147 (and further digested, in anaerobic unit 120).

Advantageously, aerobic unit(s) 140 may be configured to significantly enhance the levels of available oxygen with respect to common methods, as vertical sheets 142 utilize sprayed wastewater with air-level oxygen as well as oxygen produced by the growing algae on biofilm, and due to the removal of excessive algae on biofilm, the enhanced oxygen levels easily penetrate through the algae on biofilm growing on vertical sheets 142. In a coarse estimation, about half of the available oxygen in aerobic unit(s) 140 may be provided by the growing algae on biofilm. The enhanced level of oxygen increases the efficiency of treatment by aerobic unit(s) 140, reduces their energy consumption, and allows for removing inorganic compounds as well. Other than described in U.S. Patent Application Publication No. 2016/0288040, aerobic unit(s) 140 is configured as an open system configured to treat wastewater and with vertical sheets 142 that are partially exposed to sunlight to support and promote growth of algae.

Advantageously, wastewater treatment system 100 operates on a much smaller surface area (down to $1/30^{th}$ of the area) than current technologies, and do not require extensive preparation and infrastructure for installation. Moreover, wastewater treatment system 100 is capable of treating highly polluted wastewater, with BOD levels up to 1500 mg/l, which are challenging or not treatable without dilution in other systems (as comparison, typical municipal wastewater is at 150-250 mg/l BOD). The arrangement of vertical sheets 142 from which the growing algae on biofilm detach by gravity and are removed is advantageous with respect to other methods like trickling filters in that they maintain high oxygen availability and do not get clogged by the growing organic material. Finally, water loss to evaporation is relatively low in disclosed wastewater treatment system 100 due to their smaller footprint and intensive oxygenation.

For example, Table 1 provides calculated data concerning the efficiency and power consumption of clarification unit 110 and its component units, and compares them to the performance of alternative technologies (e.g., aerated lagoons, rotating biological contactors, plug-flow activated-sludge, etc.). As illustrated in Table 1, disclosed wastewater treatment system 100 has an energy consumption that is almost three times smaller than that of alternative technologies, for the same amount of digested organic material. This advantage results from the cumulative power reduction due to the extensive use of anaerobic digestion that required a low power consumption, and the high oxygen availability in aerobic unit 140 that is due to its structure of using vertical sheets 142 and removing the detaching algae on biofilm biomass.

TABLE 1

Theoretical calculation of the system's power consumption.

| | Anaerobic digestion unit 120 | Aerobic anoxic air lift reactor 130 | Aerobic unit 140 | Clarification unit 110 (Total) | Alternative technologies |
|---|---|---|---|---|---|
| Efficiency (%) | 40% | 25% | 80% | 98% | 98% |
| Specific power consumption ($Kw/Kg_{BOD}$) | 0.1 | 0.9 | 0.34 | 0.33 | 0.9 |
| BOD digested ($Kg_{BOD}$/day) | 6.9 | 2.6 | 7.5 | 16.9 | 16.8 |
| Daily energy consumption (Kwh/day) | 0.69 | 2.32 | 2.54 | 5.54 | 15.13 | it is noted that the efficiency of anaerobic digestion unit 120 and of aerobic anoxic air lift reactor 130 were calculated with respect to the levels of BOD, wastewater retention times, wastewater temperature and sludge concentration in the stages of clarification unit 110 and with respect to literature data. The efficiency of aerobic unit 140 was measured experimentally as the relation between the daily rate of BOD digestion (as the throughput of second stream 83 times the difference between the BOD concentrations in delivered effluent 85 and second stream 83) and the area of vertical sheets 142. In addition, continuous measurement of the oxygen concentration in the wastewater streams was used to corroborate the calculations and provide continuous monitoring of the BOD levels throughout clarification unit 110 and its components. The electric energy consumption was also measured continuously and compared to the oxygen concentration measurements.

FIG. 3 is a high-level flowchart illustrating a wastewater treatment method 200, according to some embodiments of the invention. The method stages may be carried out with respect to wastewater treatment system 100 described above, which may optionally be configured to implement method 200. Method 200 may comprise the following stages, irrespective of their order.

Wastewater treatment method 200 may comprise reducing an organic load of received influent by anaerobic digestion to yield a first stream (stage 210), treating the first stream and further reducing the organic load thereof under aerobic anoxic conditions to yield a second stream (stage 220), and clarifying the second stream and delivering effluent (stage 230) by sprinkling the second stream onto the vertical sheets aerobically (stage 232), and collecting and removing organic matter detaching from and falling off the vertical sheets (stage 234).

Wastewater treatment method 200 may further comprise operating the method with off-grid energy (stage 240), e.g., using solar panels. Wastewater treatment method 200 may further comprise controlling flows of the first and second stream remotely (stage 250), e.g., via communication link(s), making wastewater treatment method 200 usable in remote areas and with a small footprint.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements e invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A transportable wastewater treatment system comprising a clarification unit that comprises:
    an anaerobic digestion unit configured to receive influent and reduce an organic load thereof to yield a first stream,
    an aerobic anoxic air lift reactor configured to treat the first stream and further reduce the organic load thereof to yield a second stream, and an aerobic unit configured to clarify the second stream and deliver effluent, the aerobic unit comprising:
a plurality of vertical sheets configured to support growth of algae on biofilm,
a sprinkling system configured to sprinkle the second stream onto the vertical sheets, and
an organic matter removal unit configured to collect organic mass falling off the vertical sheets.

2. The transportable wastewater treatment system of claim 1, further comprising an energy source and a control unit configured to control flows through the system.

3. The transportable wastewater treatment system of claim 2, wherein the clarification unit further comprises pipework, pumps and valves which are controlled by the control unit.

4. The transportable wastewater treatment system of claim 2, wherein the control unit is controlled remotely.

5. The transportable wastewater treatment system of claim 4, wherein the energy source is off-grid.

6. The transportable wastewater treatment system of claim 5, wherein the energy source comprises solar panels and/or wind turbines connected to electric storage devices.

7. The transportable wastewater treatment system of claim 5, wherein the system is transportable and independent of infrastructure.

8. The transportable wastewater treatment system of claim 2, wherein the energy source is off-grid.

9. The transportable wastewater treatment system of claim 8, wherein the energy source comprises solar panels and/or wind turbines connected to electric storage devices.

10. The transportable wastewater treatment system of claim 1, wherein the system is transportable and independent of infrastructure.

11. The transportable wastewater treatment system of claim 1, wherein the vertical sheets are made of ultraviolet-resistant polypropylene nets having between 50% and 90% shading.

12. A wastewater treatment method comprising:
reducing an organic load of received influent by anaerobic digestion to yield a first stream,
treating the first stream and further reducing the organic load thereof under aerobic anoxic conditions to yield a second stream, and
clarifying the second stream and delivering effluent by:
sprinkling the second stream onto vertical sheets aerobically, and
collecting and removing organic matter falling off the vertical sheets.

13. The wastewater treatment method of claim 12, further comprising operating the method with off-grid energy.

14. The wastewater treatment method of claim 13, further comprising controlling flows of the first and second stream remotely.

15. The wastewater treatment method of claim 13, wherein the off-grid energy is provided by solar panels and/or wind turbines connected to electric storage devices.

16. The wastewater treatment method of claim 12, further comprising controlling flows of the first and second stream remotely.

17. The wastewater treatment method of claim 12, wherein the vertical sheets are made of ultraviolet-resistant polypropylene nets having between 50% and 90% shading.

18. An aerobic unit configured to clarify wastewater and deliver effluent, the aerobic unit comprising:
a plurality of vertical sheets configured to support growth of algae on biofilm,
a sprinkling system configured to sprinkle the wastewater onto the vertical sheets, and
an organic matter removal unit configured to collect organic mass falling off the vertical sheets,
wherein the vertical sheets are made of ultraviolet-resistant polypropylene nets having between 50% and 90% shading.

* * * * *